United States Patent
Fernandes

(10) Patent No.: US 8,494,844 B2
(45) Date of Patent: Jul. 23, 2013

(54) AUTOMATED SOUND SEGMENT SELECTION METHOD AND SYSTEM

(75) Inventor: David N. Fernandes, Toronto (CA)

(73) Assignee: Human Centered Technologies, Inc., Ontario (CA)

( * ) Notice: Subject to any disclaimer, the term of this patent is extended or adjusted under 35 U.S.C. 154(b) by 916 days.

(21) Appl. No.: 12/592,125

(22) Filed: Nov. 19, 2009

(65) Prior Publication Data

US 2010/0153101 A1 Jun. 17, 2010

Related U.S. Application Data

(60) Provisional application No. 61/116,086, filed on Nov. 19, 2008.

(51) Int. Cl.
*G10L 21/00* (2006.01)
*G10L 11/00* (2006.01)

(52) U.S. Cl.
USPC ........... 704/220; 704/207; 704/208; 704/270; 704/231; 704/251

(58) Field of Classification Search
USPC .......................... 704/207–209, 220, 231, 251
See application file for complete search history.

(56) References Cited

U.S. PATENT DOCUMENTS

| | | | |
|---|---|---|---|
| 4,899,289 A | 2/1990 | Appel | |
| 5,918,223 A | 6/1999 | Blum et al. | |
| 6,178,387 B1 | 1/2001 | Wang | |
| 6,208,967 B1 * | 3/2001 | Pauws et al. | 704/256.8 |
| 6,665,644 B1 | 12/2003 | Kanevsky et al. | |
| 6,721,445 B1 | 4/2004 | Azencott | |
| 6,751,564 B2 | 6/2004 | Dunthorn | |
| 6,907,367 B2 | 6/2005 | Baggenstoss | |
| 6,990,417 B2 | 1/2006 | Yamaguchi et al. | |
| 7,096,132 B2 | 8/2006 | Patrick et al. | |
| 2003/0046036 A1 * | 3/2003 | Baggenstoss | 702/189 |
| 2004/0110478 A1 * | 6/2004 | Raj et al. | 455/161.3 |
| 2004/0167774 A1 * | 8/2004 | Shrivastav | 704/207 |
| 2005/0171774 A1 | 8/2005 | Applebaum et al. | |
| 2006/0280313 A1 * | 12/2006 | Schmidmer et al. | 381/56 |
| 2007/0005357 A1 * | 1/2007 | Moran et al. | 704/246 |
| 2007/0027687 A1 * | 2/2007 | Turk et al. | 704/246 |
| 2007/0033037 A1 * | 2/2007 | Mowatt et al. | 704/251 |
| 2007/0185706 A1 * | 8/2007 | Chen et al. | 704/200.1 |

(Continued)

OTHER PUBLICATIONS

Yu et al, "Objective Voice Analysis for Dysphonic Patients: A Multiparametric Protocol Including Acoustic and Aerodynamic Measurements", Journal of voice, vol. 15, No. 4, pp. 529-542, 2001.*

(Continued)

*Primary Examiner* — Pierre-Louis Desir
*Assistant Examiner* — Abdelali Serrou
(74) *Attorney, Agent, or Firm* — Kagan Binder, PLLC

(57) ABSTRACT

A computerized method and system is provided for automatically selecting from a digitized sound sample a segment of the sample that is optimal for the purpose of measuring clinical metrics for voice and speech assessment. A quality measure based on quality parameters of segments of the sound sample is applied to candidate segments to identify the highest quality segment within the sound sample. The invention can optionally provide feedback to the speaker to help the speaker increase the quality of the sound sample provided. The invention also can optionally perform sound pressure level calibration and noise calibration. The invention may optionally compute clinical metrics on the selected segment and may further include a normative database method or system for storing and analyzing clinical measurements.

28 Claims, 8 Drawing Sheets

U.S. PATENT DOCUMENTS

| | | | |
|---|---|---|---|
| 2007/0213981 A1* | 9/2007 | Meyerhoff et al. | 704/243 |
| 2007/0213982 A1* | 9/2007 | Xi et al. | 704/243 |
| 2008/0040110 A1 | 2/2008 | Pereg et al. | |
| 2008/0234558 A1* | 9/2008 | Kumar et al. | 600/306 |
| 2008/0249773 A1* | 10/2008 | Bejar et al. | 704/243 |

OTHER PUBLICATIONS

Multidimensional Voice Program (MDVP); KayPENTAX (formerly Kay Elemetrics), http://kayelemetrics.com/index.php?option=com_product&itemid=3&controller=product&task=learn_more&cid%5b%5d=56, published before Nov. 19, 2008.

Dr. Speech Vocal Assessment; Tiger DRS, http://www.drspeech.com/vocalass.html, published before Nov. 19, 2008.

LingWaves Voice Clinic Suite Pro, WEVOSYS, http://www.wevosys.com/products/lingwaves/lingwaves_sets/lingwaves_voice_clinic_suite_pro.html, published before Nov. 19, 2008.

* cited by examiner

US 8,494,844 B2

AUTOMATED SOUND SEGMENT SELECTION METHOD AND SYSTEM

CROSS-REFERENCE TO RELATED APPLICATIONS

This application claims the benefit of U.S. Provisional Patent Application Ser. No. 61/116,086 filed Nov. 19, 2008, which is expressly incorporated herein in its entirety by reference thereto.

FIELD OF INVENTION

The invention relates generally to systems and methods for measuring aspects of human performance with respect to voice and speech production, and more specifically for automatically selecting segments of sound samples for the purpose of measuring clinical metrics.

BACKGROUND OF THE INVENTION

Computerized assessment systems may be used to determine how well a human subject performs on a specific task or how a subject's function compares with that of normal subjects. Such assessment can be used to determine eligibility for medical benefits, to guide medical treatment, and to guide training in areas of human performance, such as voice and speech production, fitness and sports. A computerized system is advantageous for assessment because it can facilitate the measurement process and the management of data.

Although it would be clearly desirable to do so, previously known voice and speech assessment systems have not been able to fully automate the measurement analysis process. Products such as the Multi-Dimensional Voice Program (MDVP) marketed by KayPENTAX (a division of PENTAX Corporation of Japan), and Praat, developed by the Institute of Phonetic Sciences at the University of Amsterdam, compute clinical voice quality metrics, such as jitter and shimmer, on sound samples provided to them. However, they do not automatically select an optimal segment of a sound sample to use for metric computation. Such sound samples are obtained from an analog to digital converter that digitizes voiced sound produced by a subject. The subject may be instructed, for example, to voice an "ah" sound for several seconds. The digital samples produced by the analog to digital converter estimate the acoustic pressure (amplitude) of the resulting sound wave as it varies over time. A corresponding sound pressure level (SPL) can then be derived from root mean square of the samples calculated over short time intervals of the digital samples.

The quality and diagnostic utility of measurements made on the sound sample are very dependent on the quality of the digital samples used to make them. It is important to use a stable portion of a vowel sound to make a measurement, and also to avoid transients and locations where the voice is "strained", as described in papers such as Recasens, D. (1999), "Acoustic analysis" in W. J. Hardcastle & N. Hewlett, "Coarticulation: Theory, Data and Techniques", pp. 322-336, Cambridge University Press, UK and in Kent, R. D., Vorperian, H. K., Kent, J. F., & Duffy, J. R. (2003), Journal of Communication Disorders, 36, 281-306, which are hereby incorporated by reference. If the signal to noise ratio is not sufficiently high, the results may not be useful. If the analog to digital converter clips too high a percentage of the values used to make measurements or there are voice breaks in the sample so that too little of the sound sample has an estimable frequency, then the measurements may also not be useful.

Other key factors limiting the quality and usefulness of measurements are excessive variance in the sound pressure levels and in the fundamental frequency. While existing products provide mechanisms for a diagnostician to assess such issues, they require the diagnostician to make an assessment and choose a segment of a sound sample to be used for analysis. Automation is very desirable for many reasons, including increasing the ease of use of the assessment system, and improving repeatability and compliance with analysis guidelines.

Various methods have been disclosed in the prior art to automatically segment speech or sound into a sequence of segments, where each segment has relatively consistent properties, such as in U.S. Pat. Nos. 6,907,367 and 6,208,967. However such segmentation is driven by the need to break up the speech for purposes of recognition and is generally not suitable to identify segments within a fairly uniform sample that are optimal for measurement of metrics.

Also, previously known voice and speech assessment systems have not been able to calibrate the absolute sound pressure level or to provide feedback to the user as to whether the subject's sound pressure level is sufficiently above the noise level to obtain an accurate measurement. It would therefore also be desirable to provide calibration functions accessible from within an assessment system.

SUMMARY OF THE INVENTION

The invention relates to a method for selecting a segment of a sound sample of a subject's voice that has been digitized by an analog to digital converter, comprising the steps of:
 (a) receiving a sound sample comprising a time series of digital samples;
 (b) determining a plurality of segments, each segment comprising a pre-defined number of consecutive digital samples;
 (c) for each segment, calculating the value of a quality measure, the quality measure being a real-valued function of at least one parameter of the segment, the parameter reflecting the suitability of the segment for use in computing clinical metrics; and
 (d) selecting the segment that has the greatest value of the quality measure, the quality measure being greater for segments that are more suitable for use in computing clinical metrics; and
 (e) storing the selected segment, or a pointer to the selected segment, in a memory.

The invention also relates to a system that implements this method.

The quality measure may be based on parameters that include the ratio of the sound pressure level of the segment to the estimated background noise, the ratio of the standard deviation of the sound pressure level for the segment to the mean of the sound pressure level, the fraction of samples in the segment that are clipped by the analog-to-digital converter, the fraction of the segment that is voiced, and the ratio of the standard deviation of the fundamental frequency for the segment to the mean of the fundamental frequency for the segment.

The invention may further perform sound pressure level calibration and noise calibration, and may provide feedback to a subject about the quality of sound being produced in real-time as the subject produces the sound.

The invention may further incorporate a module to compute clinical metrics on selected segments and a normative database with a module that compares clinical measurements with normative values.

DETAILED DESCRIPTION

Figure 1:
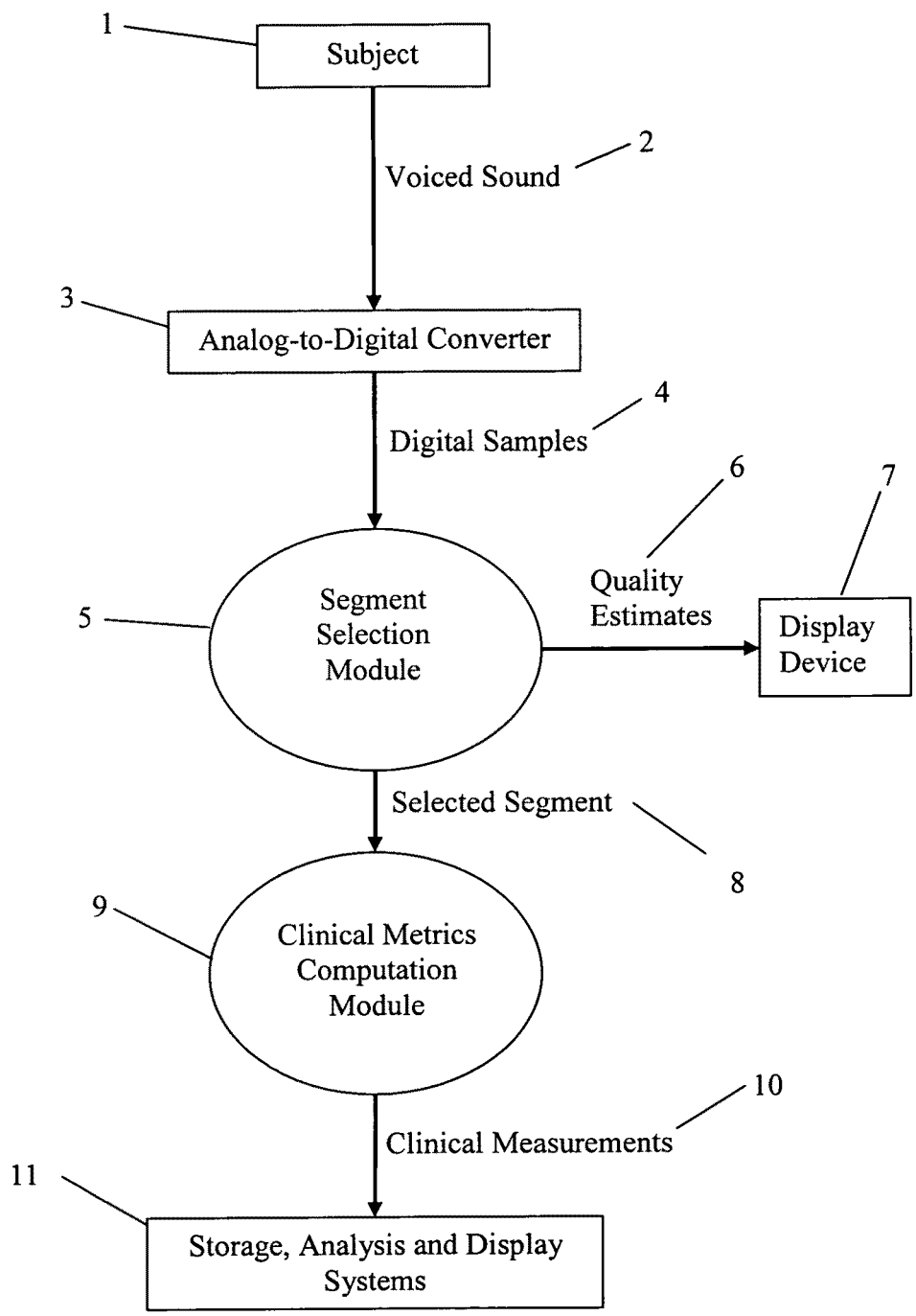
FIG. 1 is a dataflow diagram showing the context of the invention.
Figure 2:
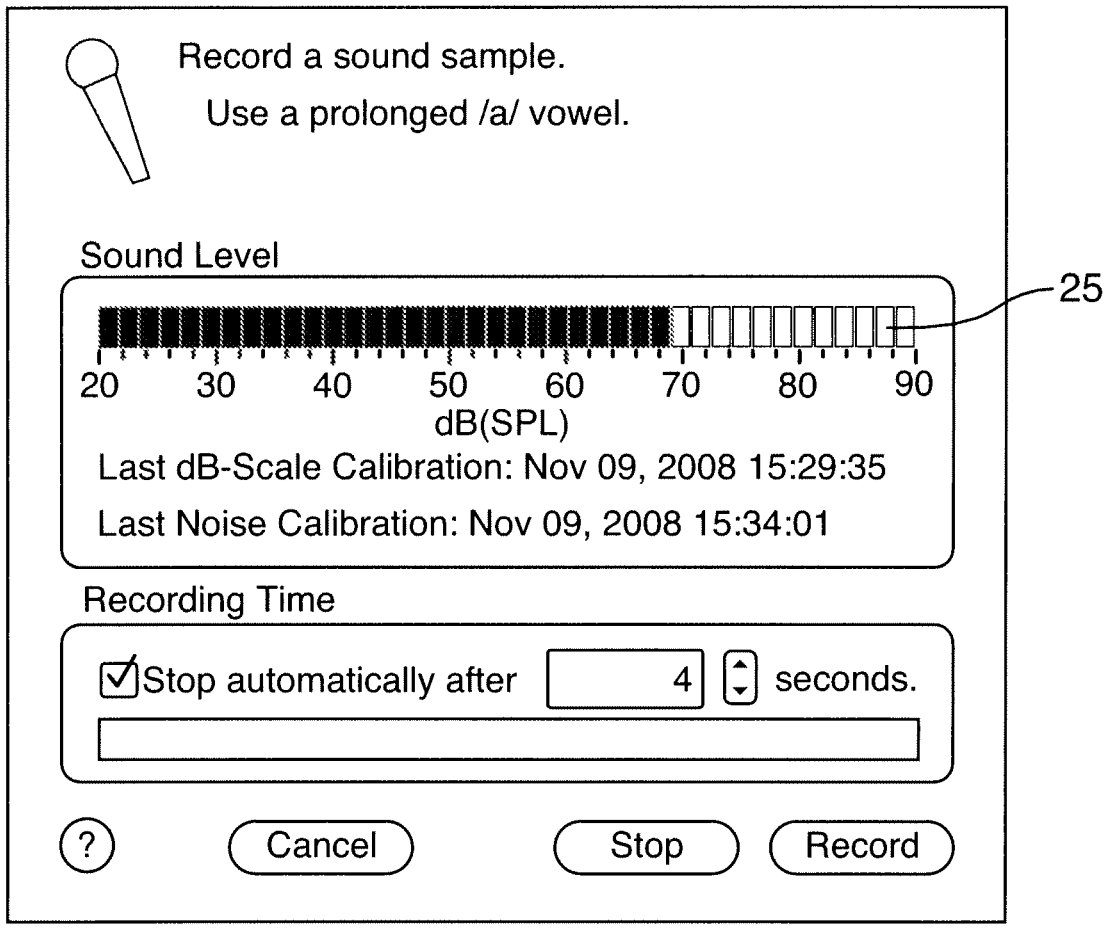
FIG. 2 is an example of a display to show quality estimates to the subject.

In a preferred embodiment, the invention is a segment selection module 5 that operates in the context shown in FIG. 1. A subject 1 makes a voiced sound 2 into a transducer that passes an analog representation of the sound signal to an analog to digital converter 3. The analog to digital converter 3 converts the analog signal into digital samples 4, which are a representation of the sound as a time series of digital amplitude values. The segment selection module 5 then analyzes the digital samples 4 to identify a selected segment 8, which is a pre-defined consecutive number of digital samples 4 determined by the segment selection module 5 to be the best such segment of digital samples 4 for the purpose of measuring clinical metrics for voice and speech assessment. The segment selection module 5 may also make quality estimates 6, such as estimating the signal to noise ratio ($r_N$) for the digital samples 4, in real-time. The quality estimates 6 may be displayed on a display device 7 for viewing by the subject 1 while the subject 1 is producing the voiced sound 2 so that the subject 1 may vary the input sound level to produce a better quality sound sample. An example of such a display is shown in FIG. 2 where the current sound level 25 is displayed to the subject 1 and signal quality is denoted by color. The selected segment 8 is processed by a clinical metrics computation module 9, which results in various clinical measurements 10, which may be passed to storage, analysis and display systems 11.

The length of a segment may be chosen, for example, to correspond to a duration of four seconds out of an eight second sound sample. In other embodiments, multiple segment lengths may be predefined and multiple, possibly overlapping, segments selected. In another embodiment, the segment length may be determined adaptively based on the value of a quality measure for multiple varying length segments.

Pre-processing of the digital samples 4 may be performed prior to passing them to the segment selection module 5. The digital samples 4 may be passed to the segment selection module 5 in various ways. For example, they may be buffered in 0.1 second intervals and transmitted via a communication network, such as the internet. In general, the components shown in FIG. 1 may be co-located or located at multiple locations, provided that the subject 1 and display device 7, if one is used, are co-located. For example, the segment selection module 5 and clinical metrics computation module 9 may be located on a remote server and require authorization by payment of a fee.

In another embodiment, the voiced sound 2 or digital samples 4 may be recorded and later accessed by the segment selection module 5 for processing.

In a preferred embodiment of the invention, the segment selection module 5 performs an exhaustive search of the digital samples 4, which a human diagnostician could not do, to identify an optimal segment of N consecutive digital samples 4 for further analysis, where N is a pre-defined number chosen to be sufficiently long for the purpose of computing the clinical metrics. For each digital sample 4, the method calculates a quality measure, q, on the segment consisting of the last N digital samples 4, where q is a function that produces greater values for segments that are better suited for use in computing clinical metrics. The quality measure may be chosen to be a monotonically increasing function of $r_N$ for the segment. Other measured parameters of the segment may additionally, or alternatively, be used to compute the quality measure.

It is not essential that the search be exhaustive. For example, the segment ending on every $k^{th}$ digital sample could be analyzed, where k is less than N.

In a preferred embodiment, the quality measure uses several estimated parameters of the segment, including $r_N$, the coefficient of variation (the standard deviation divided by the mean) of the sound pressure level for the segment ($CV_{SPL}$), the fraction of digital samples 4 in the segment that were clipped by the analog to digital converter 3 ($r_c$), the fraction of the segment that is voiced (i.e. that has an estimable frequency) ($r_v$) and the coefficient of variation of the fundamental frequency for the segment ($CV_{F_0}$). For example, the quality measure may be defined as:

$$q = w_1(r_N)w_2(CV_{SPL})w_3(r_c)w_4(r_v)w_5(CV_{F_0}) \quad (1)$$

where $$w_1(x) = \begin{cases} 0 & \text{if } x < 0 \\ (1-\rho)\frac{x}{x_1} & \text{if } 0 \le x < x_1 \\ 1 - \rho\frac{x_2 - x}{x_2 - x_1} & \text{if } x_1 \le x < x_2 \\ 1 & \text{if } x \ge x_2 \end{cases} \quad (2)$$

$$w_2(x) = e^{-5x} \quad (3)$$

$$w_3(x) = e^{-30x} \quad (4)$$

$$w_4(x) = e^{-5(1-x)} \quad (5)$$

$$w_5(x) = e^{-20x} \quad (6)$$

where $0<\rho<1$ and $0<x_1<x_2$. For example, $\rho$, $x_1$ and $x_2$ may chosen so that $0.3<\rho<0.6$, $20\,dB<x_1<34\,dB$ and $32\,dB<x_2<46\,dB$, where $x_1$ is considered to be a marginal or acceptable level and $x_2$ is a preferred level. The value of $\rho$ may be set to 0.4, the value of $x_1$ to 30 dB, and the value of $x_2$ to 42 dB.

The fundamental frequency, $F_0$, may be calculated, for example, using the algorithm described in Boersma, P. (1993), "Accurate short-term analysis of the fundamental frequency and the harmonics-to-noise ratio of a sampled sound", IFA Proceedings 17, 97-110, which is hereby incorporated by reference. $F_0$ may be calculated over successive intervals of fixed duration, for example 0.013 seconds, so that several estimates are made over the duration of a segment.

In another embodiment, the quality measure may have the same form as equation 1 but with different values of the constants used in the weighting functions (equations 2-6). In general, the constants used in equations 2-6 are selected based on assessment of the appropriate relative weight to give each parameter as determined by experimentation. For example, the function $w_2$ may be defined to be $w_2(x)=e^{-k_2 x}$, where $k_2$ is a pre-defined number between 2 and 15; the function $w_3$ may be defined to be $w_3(x)=e^{-k_3 x}$, where $k_3$ is a pre-defined number between 10 and 50; the function $w_4$ may be defined to be $w_4(x)=e^{-k_4(1-x)}$, where $k_4$ is a pre-defined number between 2 and 15; and the function $w_5$ may be defined to be $w_5(x)=e^{-k_5 x}$, where $k_5$ is a pre-defined number between 10 and 40.

In another embodiment, the quality measure may have the same form as equation 1 but employ different weighting functions. For example, q may be defined as in equation 1, but with $w_3(x)=(1-x)^5$ for $x \leq 0.05$ and $w_3(x)=0.77378\, e^{-30(x-0.05)}$ for $x>0.05$.

In some embodiments, a quality measure of the form of equation 1 may be used, but with one or more, but not all, of the weighting functions set to unity, that is $w_i(x)=1$, so as to eliminate the effect of the corresponding parameter.

It is not essential that a weighting function be continuous. For example, the weighting function $w_3$ defined in equation 3 could be modified to be $10^{-10}$ for $x>0.2$.

In other embodiments, a different form of the quality measure may be used.

In another embodiment, the quality measure may employ additional parameters of the sound sample. For example, an additional weighting factor might be based on the stationarity of the signal as measured by the rate of change of the SPL mean and variance.

In another embodiment, multiple quality measures may be used to select segments for use in calculating particular metrics. For example, a metric that may be measured is the Dysphonia Severity Index (DSI), which is defined in Wuyts, F. L., De Bodt, M. S., Molenberghs, G., Remacle, M., et al. (2000), "The Dysphonia Severity Index: An objective measure of vocal quality based on a multiparameter approach", Journal of Speech, Language, and Hearing Research, 43(3), 796-809, which is hereby incorporated by reference. The DSI requires measuring, amongst other things, the minimum SPL that a subject can achieve without the subject's voice breaking. For this measurement, it is preferable to select a segment that includes the minimum SPL location within the sound sample, so that a quality measure that prefers regions of lower SPL is desired rather than a measure like equation 1 that prefers regions of high $r_N$.

For tasks where a predetermined sequence of words or phrases are spoken (e.g., reading a passage of text), the segment selection module 5 may utilize a speech recognition engine to locate specific phrases for further analysis.

In another embodiment, the invention may include a clinical metrics computation module 9 to make clinical measurements 10 on the selected segment(s) 8. Examples of clinical voice metrics that may be measured on a sound sample consisting of a prolonged "ah" sound include sound pressure level (SPL), fundamental frequency ($F_0$), degree voiceless, degree voice breaks, jitter (absolute, local, PPQ, & RAP), shimmer (local, 3-, 5-, & 11-point APQ), harmonics-to-noise and noise-to-harmonics ratios, and the dysphonia severity index. Examples of clinical speech metrics that may be measured on a sound sample of a subject reading a passage of text include the SPL and the mean and standard deviation of $F_0$.

Normative Database

Figure 7:
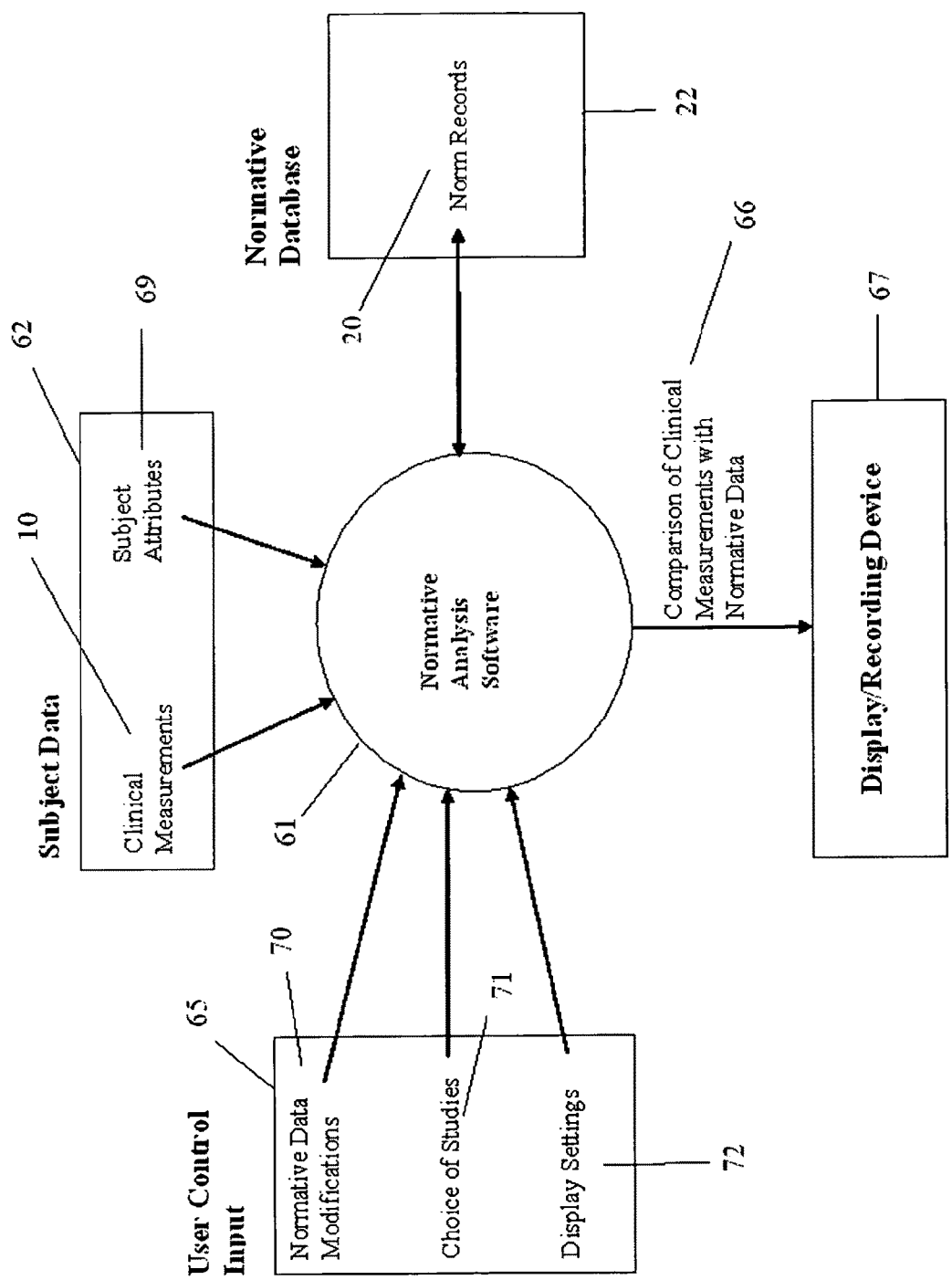
FIG. 7 depicts a normative database subsystem that may be included in the invention in some embodiments.

In another embodiment, referring to FIGS. 1 and 7, the invention may further include a storage, analysis and display system 11, which includes a database of clinical measurements 10 and a normative database 22 with a module that compares clinical measurements with normative data, such as the normative database described in U.S. provisional patent application No. 61/034,257, which is hereby incorporated by reference.

In the embodiment shown in FIG. 7, normative analysis software 61 compares subject data 62, which includes clinical measurements 10, against normative data extracted or derived from norm records 20 contained in a normative database 22. Normative data used for comparison may be single-study normative data extracted from one norm record 20, or may be consolidated from multiple norm records 20 associated with multiple studies. The normative analysis software 61 may employ user control input 65 and may display or record the comparison of clinical measurements with normative data 19 on a display/recording device 67.

Clinical measurements for one or more subjects may be stored and managed in a database (subject DB) independent from the normative database. Subject data 62 may include clinical measurements 10, which may be compared against normative data, and subject attributes 69. The subject DB may include subject data of a particular subject for multiple metrics and may include multiple clinical measurements for the same metric based on selected segments 8 selected at multiple points in time.

The subject attributes 69 may be used by the normative analysis software 61 to automatically determine, for a metric, which norm records 20 to extract from the normative database 22 to be used to derive consolidated normative data, or to select a single norm record, for use in the comparison as normative data. Alternatively, the user may specify by a choice of studies 71 which norm records 20 to extract from the normative database 22 to form the normative data.

The normative analysis software 61 may combine normative data from multiple norm records 20 to produce normative data based on the nature of the distribution of the clinical measurements, for example, using statistical parameters and ancillary data contained in the norm records 20. The software 61 may determine which norm records 20 to combine by comparing the norm records 20 using standard statistical procedures, and then combining them into normative data if the norm records 20 are statistically compatible. The software 61 may also calculate consolidated statistical parameters for the normative data.

The normative analysis software 61 may automatically derive normative thresholds for the normative data from statistical parameters and normative thresholds contained in single-study norm records 20. Alternatively, the normative thresholds may be specified by the user through normative data modifications 70.

One method for automatically deriving the normative thresholds for the normative data is to set the upper threshold of the normative data as the maximum of the single study norm records 20 thresholds, and the lower threshold as the minimum of the single study norm records 20 thresholds. Another method would be to take standard confidence limits, such as the 95% confidence limits, of the normative data based on the consolidated statistical parameters.

The process of comparing clinical measurements 10 for a subject with normative data may involve receiving clinical measurements 10 for a subject belonging to a segment of a population, where a population segment is a subset of the population characterized by attributes relevant to the metric or, where there are no such relevant attributes, the entire population. The next step may be to extract norm records 20 corresponding to the metric and population segment from a normative database 22, wherein the norm records 20 include normative data that characterize the distribution of clinical measurements for the population segment. If more than one norm record 20 is extracted, the multiple norm records 20 may be combined to produce normative data. The clinical measurements for the subject may then be compared with the normative data, and data may be generated showing the comparison of the clinical measurements with normative data 19 for output to a display or for recording in a storage element.

The user may provide display settings 72 which are used by the normative analysis software 61 to determine the form of the display of the comparison of clinical measurements with normative data 19.

The system may allow the user to view, modify or add norm records 20 by entering normative data modifications 70.

Figure 8:
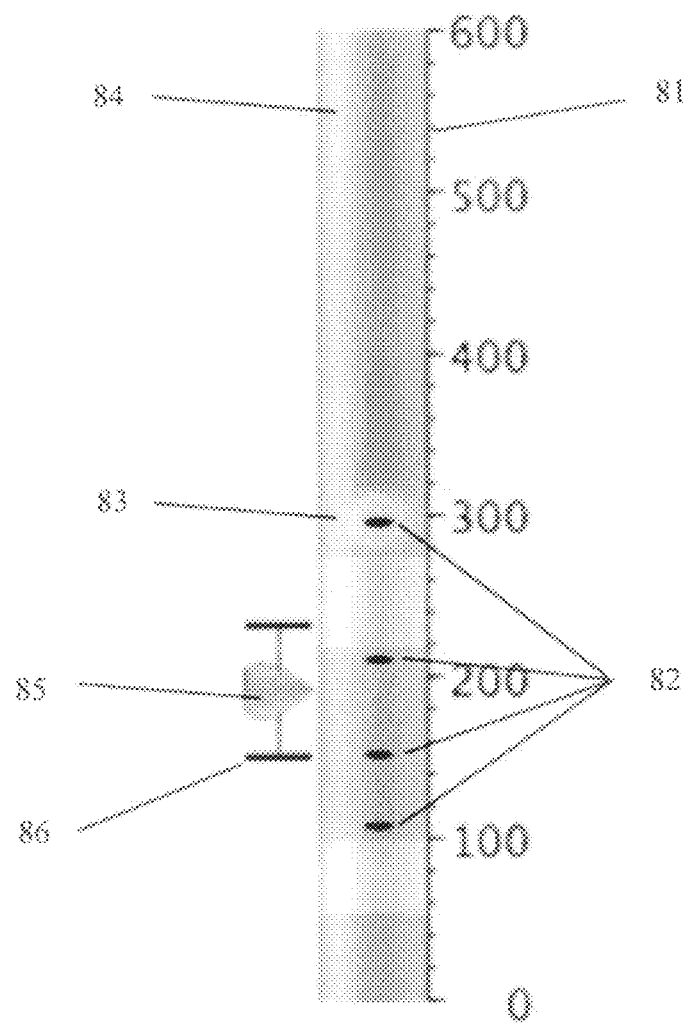
FIG. 8 is an example of a display produced by a normative database subsystem showing a comparison of clinical measurements with normative data for four clinical measurements for a single subject.

FIG. 8 shows an example, for one clinical metric, of a comparison of clinical measurements with normative data 19 produced by one embodiment of the invention for a single assessment session. The metric axis 81 shows the range over which clinical measurements might fall. Individual clinical measurement marks 82 indicate each clinical measurement for the subject obtained during an assessment session. Colored or otherwise differentially coded bars 83 represent the locations of normative ranges, falling between an upper and a lower normative threshold, on the metric axis. For example, the color green may be used to represent the range over which a clinical measurement is between the nominal low normative threshold and high normative threshold 84. The color red may be used to represent the ranges over which a clinical measurement is above a high stringent normative threshold 83 or below a low stringent normative threshold 85. The form of the image showing a comparison of clinical measurements with normative data 19 as exemplified by FIG. 8 is not dependent on the metric or its properties.

A summary indicator 85 may be used to show a summary value calculated from the individual clinical measurements. A default setting for each metric or user-entered display settings 72 specify how this summary value is calculated, such as by mean, robust mean, median, maximum or minimum. Limit indicators 86 may be used to show the spread of the clinical measurements. A default setting for each metric or user-entered display settings 72 may specify how this spread is calculated, such as by range, standard deviation, standard error or inter-quartile range of the clinical measurements.

SPL Calibration

Figure 3:
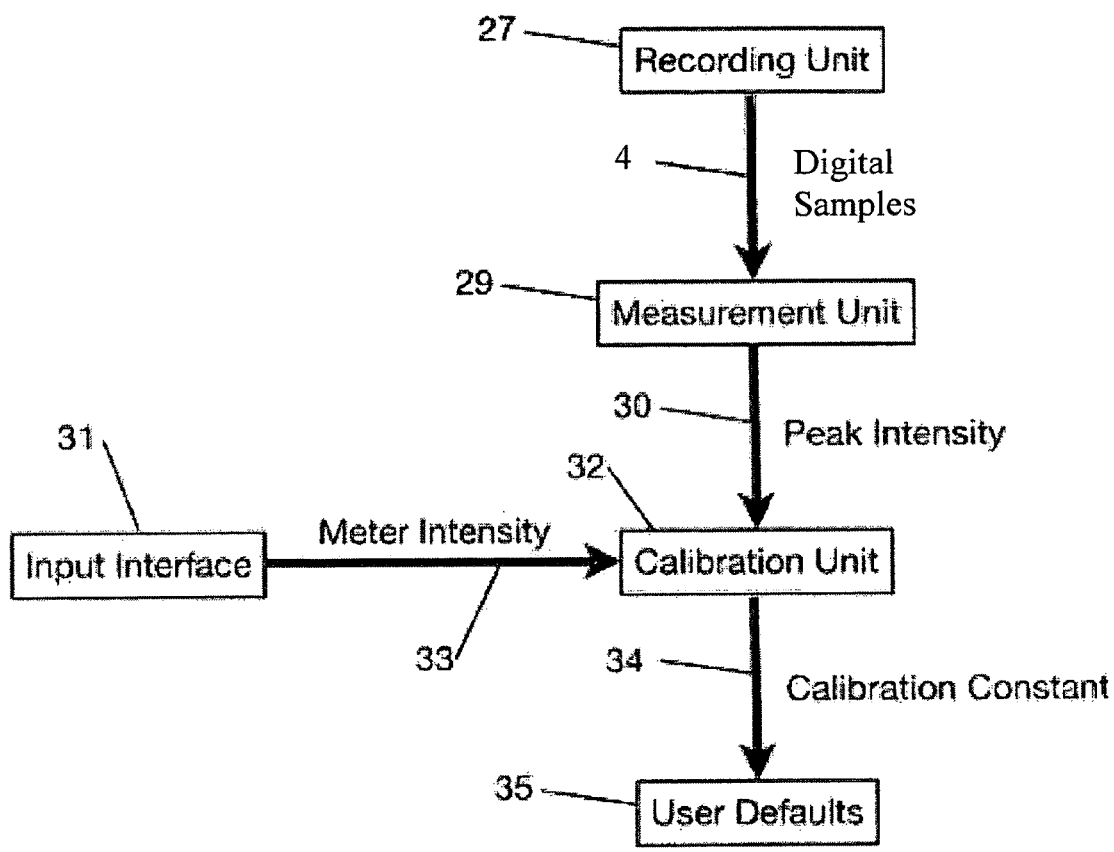
FIG. 3 is a dataflow diagram of a subsystem to perform sound pressure level calibration.

The absolute sound pressure level in decibels (dB-SPL) of a subject's voice provides a useful clinical metric. To obtain this measurement, the response of the measurement system must be calibrated with respect to a sound source of known intensity. One embodiment of the present invention includes a subsystem for sound pressure level calibration. A dataflow diagram for one embodiment of this subsystem is shown in FIG. 3.

A recording unit 27 records digital samples 4 of sound produced by a subject or a calibration sound source. Measurement unit 29 computes the peak sound intensity 30. This peak intensity is the maximum intensity for the entire sound sample, where the intensity is the mean square amplitude, and is computed over successive intervals of duration between 0.01 an 1.0 sec, for example, 0.1 sec.

The instrument operator independently measures the peak sound intensity during the recording using a standalone sound-level meter and enters this value in the input interface 31. The calibration unit 32 uses this meter-measured intensity 33 together with the peak intensity 30 to compute a calibration constant 34 as follows:

$$c_{SPL} = \frac{10^{\frac{I_{M(dB)}}{10}}}{I_p} \qquad (8)$$

where $I_{M\,(dB)}$ is the meter-measured peak intensity 33 in dB; and $I_p$ is the peak intensity 30.

The calibration constant 34 is stored as a user default parameter 35 available to the software application. When future measurements are made, the absolute sound pressure level in dB-SPL can be determined from intensity I as follows:

$$I_{dB\,SPL} = 10\,\log_{10}(c_{SPL}I) \qquad (9)$$

In another embodiment, the meter-measured intensity 33 is read directly from the sound-level meter using an electrical data interface such as RS-232 or USB.

Noise Calibration

Figure 4:
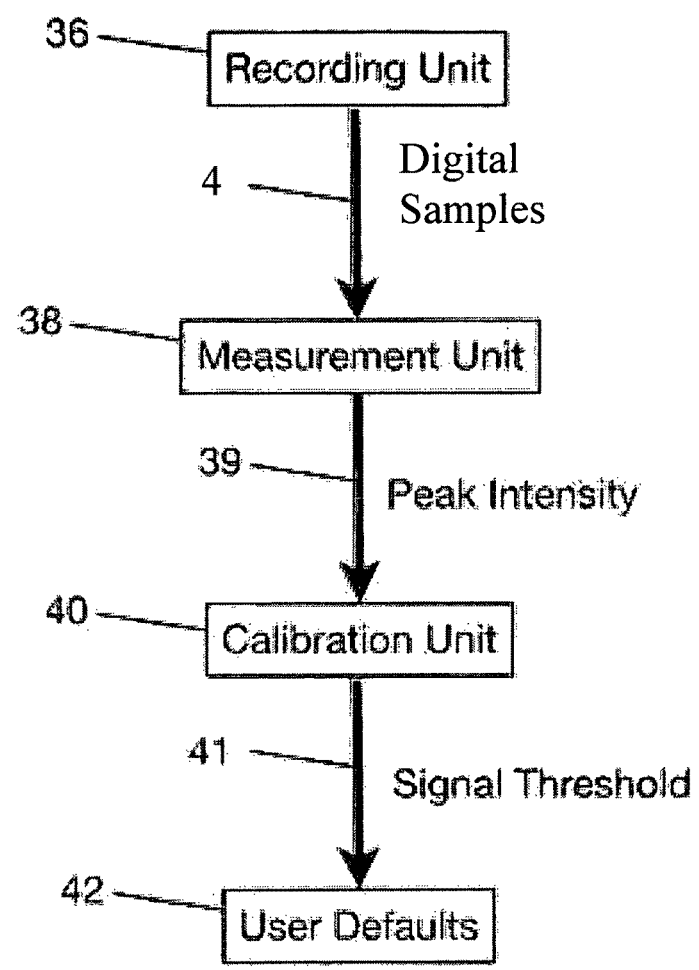
FIG. 4 is a dataflow diagram of a subsystem to perform noise calibration.

Measurement accuracy depends on the signal-to-noise ratio (SNR) for the sound sample, where noise sources include both instrumental and environmental noise. The SNR, therefore, varies according to hardware configuration and the environment in which a measurement is made. For clinically valid measurements to be made, the SNR must be above known threshold values. It is therefore desirable for the assessment system to estimate the SNR and to provide feedback to the subject 1 as to whether the SNR is sufficient for valid measurements to be made by displaying this quality estimate 6 to the subject 1. One embodiment of the present invention includes a subsystem for noise calibration and user feedback. A dataflow diagram for this subsystem is shown in FIG. 4.

Recording unit 36 records digital samples 4 of background noise for a period of a few minutes. Measurement unit 38 computes the peak intensity 39, where the intensity is computed over successive intervals of duration between 0.01 an 1.0 sec, for example, 0.1 sec. The calibration unit 40 converts the peak intensity to an absolute sound pressure level using Equation 9, and adds a fixed, known SNR threshold, for example, 30 dB ("marginal" threshold) or 42 dB ("preferred" threshold) to get a signal threshold 41.

The signal threshold 41 is stored as a user default parameter 42 available to the software application. When future sound samples are recorded, this threshold can be used by the user interface of the recording unit to alert the operator if the sound amplitude is below the desired threshold. An example of this user interface is shown in FIG. 2. In one embodiment, the sound level indicator 25 appears red if the SNR is less than the marginal threshold value, green if it is greater than the preferred threshold, and yellow if it is between the two thresholds. In another embodiment, graphical representations such as tick marks or colored regions appear adjacent to or overlapping the sound level indicator to show the locations of SNR thresholds. In another embodiment, graphical or textual alerts are presented to the user if the SNR is too low for a valid measurement.

Figure 6:
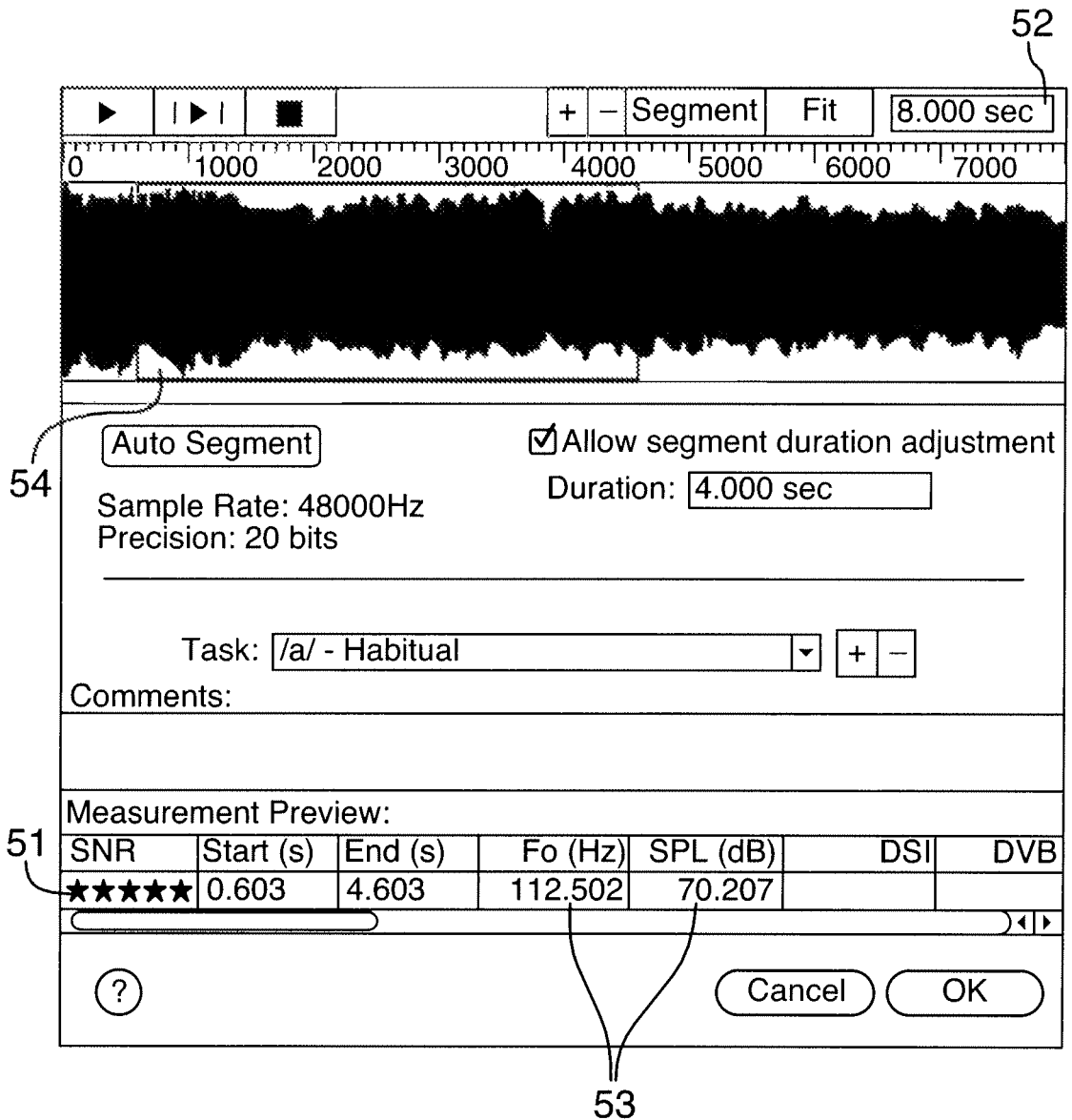
FIG. 6 shows an example of a display showing the sound sample quality in real-time as it is collected.

In another embodiment, the values of the quality measure or individual weighting functions, the parameters used to compute the quality measure, or clinical measurements made on the current segment may be displayed in real-time for viewing by a diagnostician who is present when the subject 1 is providing a sound sample. An example of such a display is shown in FIG. 6. FIG. 6 shows the value of the quality weighting function $w_1$ in graphical form 51 by filling in 0-5 stars to indicate increasing quality. FIG. 6 also shows an example of some measurements for the current segment 53 that could be displayed, the total sound sample duration 52, and a rectangular selection 54 denoting the location of the segment. The segment selection 54 can be moved or resized using a cursor allowing the user to override the automated segment selection algorithm.

Computer System Embodiments

The various embodiments of the invention may be implemented in software running on one or more programmable processors. The software may include executable code stored in a memory or memories for execution by a processor. A memory may include any static, transient or dynamic memory or storage medium, including without limitation read-only memory (ROM) or programmable ROM, random access memory (RAM), transient storage in registers or electrical, magnetic, quantum, optical or electronic storage media. A processor includes any device or set of devices, howsoever embodied, whether distributed or operating in a single location, that is designed to or has the effect of carrying out a set of instructions, but excludes an individual or person. A system implemented in accordance with the present invention may comprise a computer system having memory and a processor to execute the code. The segment selection module 5 may be implemented as a server that receives from clients requests to select a segment along with digital samples 4 of a sound sample, and that identifies and returns to the client selected segments 8. The server may transmit an indication of the selected segment 8 in the form of the start and end digital sample locations within the sound sample.

The quality measure defined in equation 1 may be implemented in software running on a programmable processor as a single pass algorithm that executes in linear time. This may be accomplished by storing time series of cumulative sums of the normalized amplitude, number of clipped digital samples, number of voiced digital samples, and fundamental frequency, and storing time series of cumulative sums of squares of the normalized amplitude and fundamental frequency. The quantities appearing in equation 1 can then be computed for a segment of length N ending at the $k^{th}$ digital sample using only two values from each time series. For example, one can compute the cumulative sum of the sound pressure level at digital sample k, $$S_k = \sum_{t=1}^{k} SPL(t),$$

so that the mean sound pressure level, $$\bar{l} = \frac{\sum_{t=k-N+1}^{k} SPL(t)}{N},$$

may be calculated as $$\bar{l} = \frac{S_k - S_{k-N}}{N},$$

for $k \geq N$ where $S_0 = 0$.

To optimize for memory usage, the intermediate time series may be maintained only for the number of digital samples in the segment, and not for the entire sound recording.

To further optimize for computation speed, the intermediate sums may be maintained in a circular buffer of size N.

To further optimize for computation speed, the weighting functions may be obtained from lookup tables.

Figure 5:
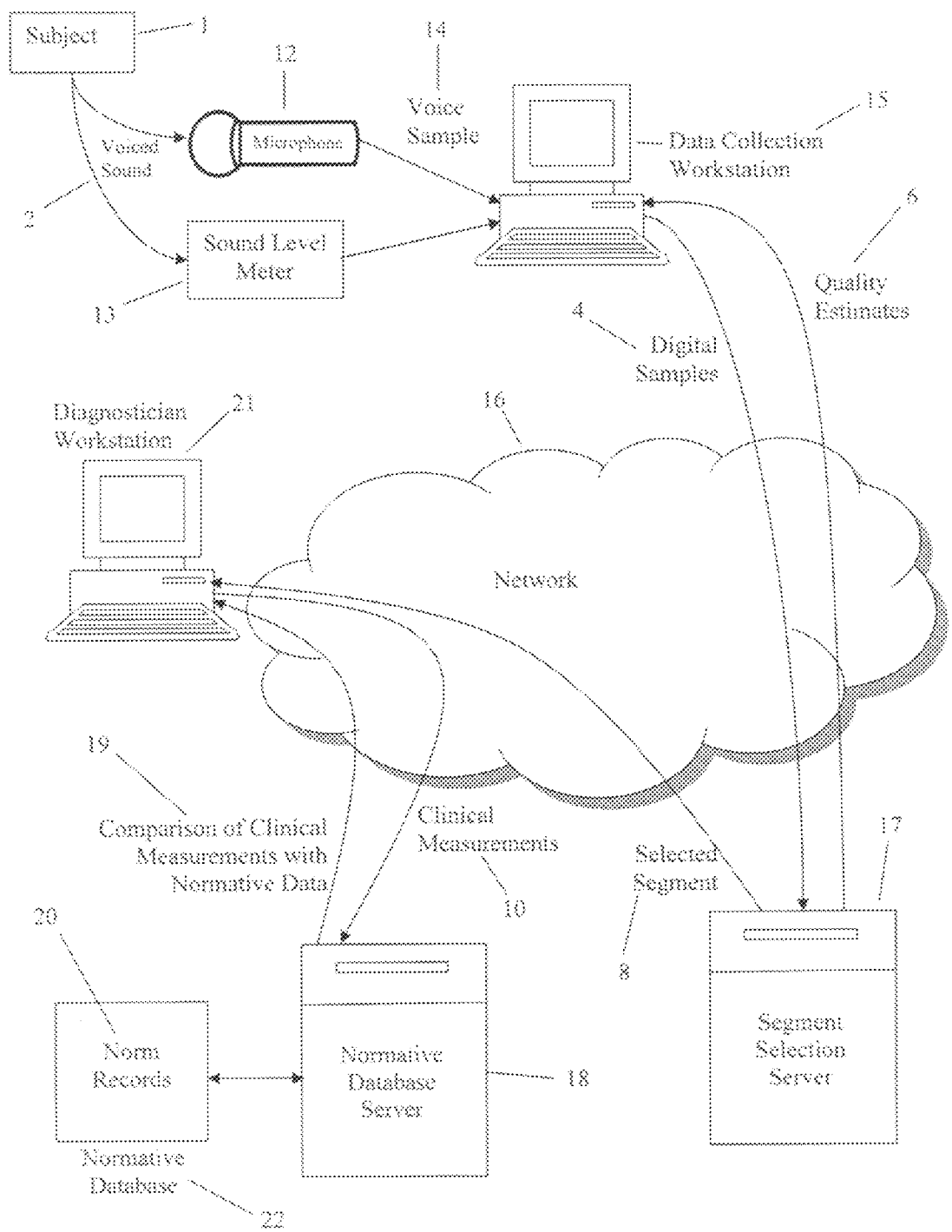
FIG. 5 shows the architecture of an embodiment of the invention as a distributed system including a normative database subsystem.

FIG. 5 depicts an embodiment of the invention as a system wherein the system performs SPL calibration, and also performs the calculation of clinical metrics and includes a normative database 22, arranged in a client-server configuration. A subject 1 produces a voiced sound 2 that is converted to an analog voice sample 14 by a microphone 12. The data collection workstation incorporates an analog to digital converter 3 to produce digital samples 4, which it may transmit over a network 16 to a segment selection server 17, along with subject identification and attributes 69. The segment selection module 5 running on the segment selection server 17 may make quality estimates 6 in real-time. The quality estimates 6 may be transmitted over the network 16 and displayed on the display device of the data collection workstation 15 for viewing by the subject 1 while the subject 1 is producing the voiced sound 2 so that the subject 1 may vary the input sound level to produce a better quality sound sample. The segment selection server 17 may transmit the selected segment 8, along with subject identification and attributes 69, to a diagnostician workstation 21 running a clinical metrics computation module 9 and having an interface module to access a normative database server 18, running normative analysis software 61, over the network 16. The diagnostician workstation 21 may transmit clinical measurements 10 computed on the selected segment 8, along with subject identification and attributes 69, to the normative database server 18 for storage and analysis. The normative database server 18 may then identify suitable norm records 20 stored in a database for comparison with the clinical measurements 10, and, optionally, with additional clinical measurements for the same subject 1 stored in a subject database. The normative database server 18 may then return a comparison of clinical measurements with normative data 19 to the diagnostician workstation 21. An example of a display showing a comparison of clinical measurements with normative data 19 is shown in FIG. 8.

It will be appreciated that the above description relates to the preferred embodiments by way of example only. Many variations on the system and method for delivering the invention without departing from the spirit of same will be clear to those knowledgeable in the field, and such variations are within the scope of the invention as described and claimed, whether or not expressly described.

What is claimed is:

1. A method for selecting a segment of a sound sample of a subject's voice that has been digitized by an analog to digital converter, comprising the steps of:
    (a) receiving the sound sample comprising a time series of digital samples;
    (b) determining a plurality of segments, each segment comprising a pre-defined number of consecutive digital samples;
    (c) for each segment, calculating the value of a quality measure, the quality measure being a real-valued function of at least one parameter of the segment, the parameter reflecting the suitability of the segment for use in computing clinical metrics;

(d) selecting the segment that has the greatest value of the quality measure, the quality measure being greater for segments that are more suitable for use in computing clinical metrics; and (e) storing the selected segment, or a pointer to the selected segment, in a memory; wherein the quality measure is the product of functions $w_1$, $w_2$, $w_3$, $w_4$, and $w_5$, where:

(a) $w_1$ is a monotonically increasing, non-negative real-valued function computed on input value $r_N$, where $r_N$ is the ratio of the sound pressure level of the segment to the estimated background noise, measured in decibels;

(b) $w_2$ is a monotonically decreasing, non-negative real-valued function computed on input value $CV_{SPL}$, where $CV_{SPL}$ is the ratio of the standard deviation of the sound pressure level for the segment to the mean of the sound pressure level for the segment;

(c) $w_3$ is a monotonically decreasing, non-negative real-valued function computed on input value $r_c$, where $r_c$ is the fraction of digital samples in the segment that are clipped by the analog-to-digital converter;

(d) $w_4$ is a monotonically increasing, non-negative real-valued function computed on input value $r_v$, where $r_v$ is the fraction of the segment that is voiced; and (e) $w_5$ is a monotonically decreasing, non-negative real-valued function computed on input value $CV_{F0}$, where $CV_{F0}$ is the ratio of the standard deviation of the fundamental frequency for the segment to the mean of the fundamental frequency for the segment.

2. The method of claim 1 wherein the function $w_1$ is defined to be $$w_1(x) = \begin{cases} 0 & \text{if } x < 0 \\ (1-\rho)\frac{x}{x_1} & \text{if } 0 \le x < x_1 \\ 1 - \rho\frac{x_2 - x}{x_2 - x_1} & \text{if } x_1 \le x < x_2 \\ 1 & \text{if } x \ge x_2 \end{cases}$$

where $0 < \rho < 1$ and $x_1$ and $x_2$ are predefined thresholds corresponding to levels of $r_N$ that are, respectively, acceptable and preferred; the function $w_2$ is defined to be $w_2(x) = e^{-k_2 x}$, where $k_2$ is a pre-defined number between 2 and 15; the function $w_3$ is to be $w_3(x) = e^{-k_3 x}$, where $k_3$ is a pre-defined number between 10 and 50; the function $w_4$ is defined to be $w_4(x) = e^{-k_4(1-x)}$, where $k_4$ is a pre-defined number between 2 and 15; and the function $w_5$ is defined to be $w_5(x) = e^{-k_5 x}$, where $k_5$ is a pre-defined number between 10 and 40.

3. The method of claim 2 wherein $k_2$ is 5, $k_3$ is 30, $k_4$ is 5, and $k_5$ is 20.

4. The method of claim 3 wherein the sound pressure level is calibrated to produce an absolute sound pressure level in decibels and $\rho$, $x_1$ and $x_2$ are chosen so that $0.3 < \rho < 0.6$, 20 dB $< x_1 <$ 34 dB and 32 dB $< x_2 <$ 46 dB.

5. The method of claim 4 wherein $\rho$ is 0.4, $x_1$ is 30 dB and $x_2$ is 42 dB.

6. The method of claim 1 wherein the sound pressure level is calibrated to produce an absolute sound pressure level in decibels.

7. The method of claim 6 wherein the value of $r_N$ is calculated in real-time as the subject presents a sound to the analog-to-digital converter, based on the last N digital samples, where N is a pre-defined number, and an indication of the value of $r_N$ is presented to the subject.

8. The method of claim 7 wherein a graphical indication of the value of $r_N$ is presented to the user along with an indication of the sufficiency of the value.

9. The method of claim 1 wherein the method selects a plurality of segments, each segment comprising a pre-defined number of consecutive digital samples selected to be used to compute a particular clinical metric.

10. The method of claim 9 wherein a plurality of quality measures are used, each quality measure being defined to select a segment suitable for the computation of a particular clinical metric.

11. The method of claim 1 wherein the method computes clinical metrics on the selected segment.

12. The method of claim 11 further comprising a normative database method for storing and analyzing clinical measurements.

13. A non-transitory computer-readable memory having recorded thereon statements and instructions for execution by a processor for selecting a segment of a sound sample of a subject's voice that has been digitized by an analog to digital converter, said statements and instructions when executed by a processor cause the processor to perform the steps of:

(a) receiving the sound sample comprising a time series of digital samples;

(b) determining a plurality of segments, each segment comprising a pre-defined number of consecutive digital samples;

(c) for each segment, calculating the value of a quality measure, the quality measure being a real-valued function of at least one parameter of the segment, the parameter reflecting the suitability of the segment for use in computing clinical metrics;

(d) selecting the segment that has the greatest value of the quality measure, the quality measure being greater for segments that are more suitable for use in computing clinical metrics; and (e) storing the selected segment, or a pointer to the selected segment, in a memory;

wherein the quality measure is the product of functions $w_1$, $w_2$, $w_3$, $w_4$, and $w_5$, where:

(a) $w_1$ is a monotonically increasing, non-negative real-valued function computed on input value $r_N$, where $r_N$ is the ratio of the sound pressure level of the segment to the estimated background noise, measured in decibels;

(b) $w_2$ is a monotonically decreasing, non-negative real-valued function computed on input value $CV_{SPL}$, where $CV_{SPL}$ is the ratio of the standard deviation of the sound pressure level for the segment to the mean of the sound pressure level for the segment;

(c) $w_3$ is a monotonically decreasing, non-negative real-valued function computed on input value $r_c$, where $r_c$ is the fraction of digital samples in the segment that are clipped by the analog-to-digital converter;

(d) $w_4$ is a monotonically increasing, non-negative real-valued function computed on input value $r_v$, where $r_v$ is the fraction of the segment that is voiced; and (e) $w_5$ is a monotonically decreasing, non-negative real-valued function computed on input value $CV_{F0}$, where $CV_{F0}$ is the ratio of the standard deviation of the fundamental frequency for the segment to the mean of the fundamental frequency for the segment.

14. A method comprising transmitting over a communications medium instructions for execution by a processor for selecting a segment of a sound sample of a subject's voice that has been digitized by an analog to digital converter, said instructions when executed by a processor cause the processor to perform the steps of:

(a) receiving the sound sample comprising a time series of digital samples;
(b) determining a plurality of segments, each segment comprising a pre-defined number of consecutive digital samples; (c) for each segment, calculating the value of a quality measure, the quality measure being a real-valued function of at least one parameter of the segment, the parameter reflecting the suitability of the segment for use in computing clinical metrics; (d) selecting the segment that has the greatest value of the quality measure, the quality measure being greater for segments that are more suitable for use in computing clinical metrics; and
(e) storing the selected segment, or a pointer to the selected segment, in a memory;
wherein the quality measure is the product of functions $w_1$, $w_2$, $w_3$, $w_4$, and $w_5$, where:
(a) $w_1$ is a monotonically increasing, non-negative real-valued function computed on input value $r_N$, where $r_N$ is the ratio of the sound pressure level of the segment to the estimated background noise, measured in decibels;
(b) $w_2$ is a monotonically decreasing, non-negative real-valued function computed on input value $CV_{SPL}$, where $CV_{SPL}$ is the ratio of the standard deviation of the sound pressure level for the segment to the mean of the sound pressure level for the segment;
(c) $w_3$ is a monotonically decreasing, non-negative real-valued function computed on input value $r_c$, where $r_c$ is the fraction of digital samples in the segment that are clipped by the analog-to-digital converter;
(d) $w_4$ is a monotonically increasing, non-negative real-valued function computed on input value $r_v$, where $r_v$ is the fraction of the segment that is voiced; and
(e) $w_5$ is a monotonically decreasing, non-negative real-valued function computed on input value $CV_{F0}$, where $CV_{F0}$ is the ratio of the standard deviation of the fundamental frequency for the segment to the mean of the fundamental frequency for the segment.

15. A non-transitory computer-readable memory storing instructions for execution by a processor for selecting a segment of a sound sample of a subject's voice that has been digitized by an analog to digital converter, said instructions when executed by a processor cause the processor to perform the steps of:
(a) receiving the sound sample comprising a time series of digital samples;
(b) determining a plurality of segments, each segment comprising a pre-defined number of consecutive digital samples;
(c) for each segment, calculating the value of a quality measure, the quality measure being a real-valued function of at least one parameter of the segment, the parameter reflecting the suitability of the segment for use in computing clinical metrics;
(d) selecting the segment that has the greatest value of the quality measure, the quality measure being greater for segments that are more suitable for use in computing clinical metrics; and
(e) storing the selected segment, or a pointer to the selected segment, in a memory;
wherein the quality measure is the product of functions $w_1$, $w_2$, $w_3$, $w_4$, and $w_5$, where:
(a) $w_1$ is a monotonically increasing, non-negative real-valued function computed on input value $r_N$, where $r_N$ is the ratio of the sound pressure level of the segment to the estimated background noise, measured in decibels;
(b) $w_2$ is a monotonically decreasing, non-negative real-valued function computed on input value $CV_{SPL}$, where $CV_{SPL}$ is the ratio of the standard deviation of the sound pressure level for the segment to the mean of the sound pressure level for the segment;
(c) $w_3$ is a monotonically decreasing, non-negative real-valued function computed on input value $r_c$, where $r_c$ is the fraction of digital samples in the segment that are clipped by the analog-to-digital converter;
(d) $w_4$ is a monotonically increasing, non-negative real-valued function computed on input value $r_v$, where $r_v$ is the fraction of the segment that is voiced; and
(e) $w_5$ is a monotonically decreasing, non-negative real-valued function computed on input value $CV_{F0}$, where $CV_{F0}$ is the ratio of the standard deviation of the fundamental frequency for the segment to the mean of the fundamental frequency for the segment.

16. A voice segment selection system for selecting a segment of a sound sample of a subject's voice that has been digitized by an analog to digital converter into a time series of digital samples, the system comprising:
(a) a processor and computer readable memory;
(b) a segmentation module for determining, using the processor, a plurality of segments from the sound sample, each segment comprising a pre-defined number of consecutive digital samples;
(c) a quality module for calculating the value of a quality measure for each segment, the quality measure being a real-valued function of at least one parameter of the segment, the parameter reflecting the suitability of the segment for use in computing clinical metrics; and
(d) a selection module for selecting the segment that has the greatest value of the quality measure and storing the selected segment, or a pointer to the selected segment, in a memory, the quality measure being greater for segments that are more suitable for use in computing clinical metrics;
wherein the quality measure is the product of functions $w_1$, $w_2$, $w_3$, $w_4$, and $w_5$, where:
(a) $w_1$ is a monotonically increasing, non-negative real-valued function computed on input value $r_N$, where $r_N$ is the ratio of the sound pressure level of the segment to the estimated background noise, measured in decibels;
(b) $w_2$ is a monotonically decreasing, non-negative real-valued function computed on input value $CV_{SPL}$, where $CV_{SPL}$ is the ratio of the standard deviation of the sound pressure level for the segment to the mean of the sound pressure level for the segment;
(c) $w_3$ is a monotonically decreasing, non-negative real-valued function computed on input value $r_c$, where $r_c$ is the fraction of digital samples in the segment that are clipped by the analog-to-digital converter;
(d) $w_4$ is a monotonically increasing, non-negative real-valued function computed on input value $r_v$, where $r_v$ is the fraction of the segment that is voiced; and
(e) $w_s$ is a monotonically decreasing, non-negative real-valued function computed on input value $CV_{F0}$, where $CV_{F0}$ is the ratio of the standard deviation of the fundamental frequency for the segment to the mean of the fundamental frequency for the segment.

17. The system of claim 16 wherein the function $w_1$ is defined to be $$w_1(x) = \begin{cases} 0 & \text{if } x < 0 \\ (1-\rho)\dfrac{x}{x_1} & \text{if } 0 \le x < x_1 \\ 1 - \rho\dfrac{x_2 - x}{x_2 - x_1} & \text{if } x_1 \le x < x_2 \\ 1 & \text{if } x \ge x_2 \end{cases}$$

where $0<\rho<1$ and $x_1$ and $x_2$ are predefined thresholds corresponding to levels of $r_N$ that are, respectively, acceptable and preferred; the function $w_2$ is defined to be $w_2(x)=e^{-k_2 x}$, where $k_2$ is a pre-defined number between 2 and 15; the function $w_3$ is defined to be $w_3(x)=e^{-k_3 x}$, where $k_3$ is a pre-defined number between 10 and 50; the function $w_4$ is defined to be $w_4(x)=e^{-k_4(1-x)}$, where $k_4$ is a pre-defined number between 2 and 15; and the function $w_5$ is defined to be $w_5(x)=e^{-k_5 x}$, where $k_5$ is a pre-defined number between 10 and 40.

18. The system of claim 17 wherein $k_2$ is 5, $k_3$ is 30, $k_4$ is 5, and $k_5$ is 20.

19. The system of claim 18 wherein the sound pressure level is calibrated to produce an absolute sound pressure level in decibels and $\rho$, $x_1$ and $x_2$ are chosen so that $0.3<\rho<0.6$, 20 dB$<x_1<$34 dB and 32 dB$<x_2<$46 dB.

20. The system of claim 19 wherein $\rho$ is 0.4, $x_1$ is 30 dB and $x_2$ is 42 dB.

21. The system of claim 16 wherein the sound pressure level is calibrated to produce an absolute sound pressure level in decibels.

22. The system of claim 21 wherein the value of $r_N$ is calculated in real-time as the subject presents a sound to the analog-to-digital converter, based on the last N digital samples, where N is a pre-defined number, and an indication of the value of $r_N$ is presented to the subject.

23. The system of claim 22 wherein a graphical indication of the value of $r_N$ is presented to the user along with an indication of the sufficiency of the value.

24. The system of claim 16 wherein the system selects a plurality of segments, each segment comprising a pre-defined number of consecutive digital samples selected to be used to compute a particular clinical metric.

25. The system of claim 24 wherein a plurality of quality measures are used, each quality measure being defined to select a segment suitable for the computation of a particular clinical metric.

26. The system of claim 16 wherein the system computes clinical metrics on the selected segment.

27. The system of claim 26 wherein the system further comprises a normative database subsystem for storing and analyzing clinical measurements using the stored selected segment.

28. The system of claim 16 wherein the system acts as a server that receives from a client a sound sample and a request to select a segment, wherein the system returns to the client an indication of the selected segment.

* * * * *